(12) United States Patent  
Kandogan

(10) Patent No.: US 9,311,900 B2
(45) Date of Patent: *Apr. 12, 2016

(54) DETECTING AND DESCRIBING VISIBLE FEATURES ON A VISUALIZATION

(71) Applicant: International Business Machines Corporation, Armonk, NY (US)

(72) Inventor: Eser Kandogan, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 526 days.

This patent is subject to a terminal disclaimer.

(21) Appl. No.: 13/729,129

(22) Filed: Dec. 28, 2012

(65) Prior Publication Data

US 2014/0104310 A1   Apr. 17, 2014

Related U.S. Application Data

(63) Continuation of application No. 13/650,282, filed on Oct. 12, 2012.

(51) Int. Cl.
  *G09G 5/377* (2006.01)
  *G06T 11/20* (2006.01)
  *G06K 9/62* (2006.01)

(52) U.S. Cl.
  CPC .............. *G09G 5/377* (2013.01); *G06K 9/6218* (2013.01); *G06T 11/206* (2013.01)

(58) Field of Classification Search
  None
  See application file for complete search history.

(56) References Cited

U.S. PATENT DOCUMENTS

| 7,894,665 | B2 | 2/2011 | Tseng et al. |
| 8,131,471 | B2 | 3/2012 | Kincaid |
| 2004/0024532 | A1 | 2/2004 | Kincaid |
| 2005/0188294 | A1 | 8/2005 | Kuchinsky et al. |
| 2008/0065287 | A1* | 3/2008 | Han et al. .................. 701/28 |
| 2008/0115050 | A1 | 5/2008 | Oliver et al. |
| 2009/0132594 | A1* | 5/2009 | Syeda-Mahmood et al. .................. 707/104.1 |
| 2010/0198757 | A1 | 8/2010 | Cheng et al. |
| 2010/0198900 | A1* | 8/2010 | Gifford .............. G06K 9/6218 708/401 |
| 2011/0145040 | A1 | 6/2011 | Zahn et al. |

OTHER PUBLICATIONS

Gephi tutorial visualization tool, 2010, URL: http://gephi.github.io/, http://gephi.github.io/users/, http://gephi.github.io/features/.*
Kim, DGCL: An Efficient Density and Grid Based Clustering Algorithm for Large Spatial Database, WAIM 2006, LNCS 4016, pp. 362-371, 2006.*
Keke Chen, Validating and Refining Clusters via Visual Rendering, 2003, IEEE International Conference on Data Mining (ICDM'03).*
Wilkinson, 2005, Graph-Theoretic Scagnostics, IEEE Symposium on Information Visualization.*
Chen, Click2Annotate: Automated Insight Externalization with Rich Semantics, 2010, IEEE Symposium on Visual Analytics Science and Technology (VAST).*
Berardi et al., Learning Recursive Patterns for Biomedical Information Extraction, Inductive Logic Programming, 16th International Conference, Aug. 24-27, 2006, pp. 79-83.

* cited by examiner

*Primary Examiner* — Ming Hon
*Assistant Examiner* — Phuc Doan
(74) *Attorney, Agent, or Firm* — Lieberman & Brandsdorfer, LLC

(57) ABSTRACT

Embodiments of the invention relate to detecting and describing visible features of a data set on a visualization. Visible features among a set of data in a view-space are detected. The visible features include potential data clusters and trends. These visual features are characterized using data-space. The characterized detected features are overlaid on visualization for supporting interaction and exploration of the data. Detected features are explored across two or more clusters for comparison of select data.

20 Claims, 9 Drawing Sheets

DETECTING AND DESCRIBING VISIBLE FEATURES ON A VISUALIZATION

CROSS REFERENCE TO RELATED APPLICATION(S)

This application is a continuation patent application claiming the benefit of the filing date of U.S. patent application Ser. No. 13/650,282 filed on Oct. 12, 2012, and titled "Detecting and Describing Visible Features On A Visualization" now pending, which is hereby incorporated by reference.

BACKGROUND

This invention relates to the analysis and visualization of data features in a dataset. More specifically, visual features are detected among the dataset in a view-space, semantics of the visual features are described and identified, and interaction with the described visual features is supported to guide development and understanding of the dataset.

Information visualization is an increasingly vital tool at the disposal of decision makers to make data consumable. A good visualization reveals structure and patterns in data, and facilitates exploration of relationships. The challenge in exploratory visualization is to represent, and interact with complicated datasets, e.g. datasets having multiple dimensions. For example, for high dimensional data, visual representation may appear cluttered, resulting in challenges for interactive exploration. Accordingly, as the complexity and variety of data increase, so do the challenges for visualization and exploration of such data.

Advances in science, government, and business depends on the ability to analyze and comprehend data and to make decisions based on insight gained from such analysis. There is a need to improve the consumability of data for everyone involved in any kind of decision making throughput in an enterprise. Such a solution should enable a broad base of users, experts, and non-experts alike to deal with and develop an understanding of complex datasets.

BRIEF SUMMARY

This invention comprises a system and computer program product for detection of visual features in a dataset and interactive exploration of the detected features.

In one aspect, a computer program product is provided for the detection and overlay of features on a data set. The computer program product comprises a computer-readable non-transitory storage medium having computer readable program code embodied thereon. When executed, the computer readable program code causes a computer to detect visual features among a set of data in a view-space. The detection of visual features includes identification of potential data clusters in the view-space and suggesting potential data clusters for exploration. The computer program product characterizes the detected visual features using data-space and overlays the characterized detected features on visualization to support interaction. The supported interaction includes exploration of the detected features for comparison of select data across two or more clusters.

In another aspect, a system is provided for the identification and visualization of dataset features. A processing unit is provided in the system in communication with data storage, the data storage having at least one data set. A functional unit is provided in communication with the processing unit. The functional unit includes tools to support data exploration. The tools include a detection manager, a characterization manager, a visualization manager, and an interaction manager. The detection manager functions to detect visual features among a set of data in a view-space. More specifically, the detection manager identifies one or more potential data clusters in the view-space and suggests the potential data clusters for exploration. The characterization manager, which is in communication with the detection manager, functions to characterize the detected visual features using data-space. The visualization manager, which is provided in communication with the characterization manager, functions to overlay the characterized detected features on visualization to support interaction. The interaction manager, which is provided in communication with the visualization manager, supports interaction includes exploration of the detected features to compare select data across two or more clusters.

In a yet further aspect, a computer program product is provided to explore a dataset. The program product includes a computer-readable storage medium having program code executable by a processor. The program code assesses visual features among a data of data in the view space, characterizes the assessed visual features, and overlays the features to support interaction therewith.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
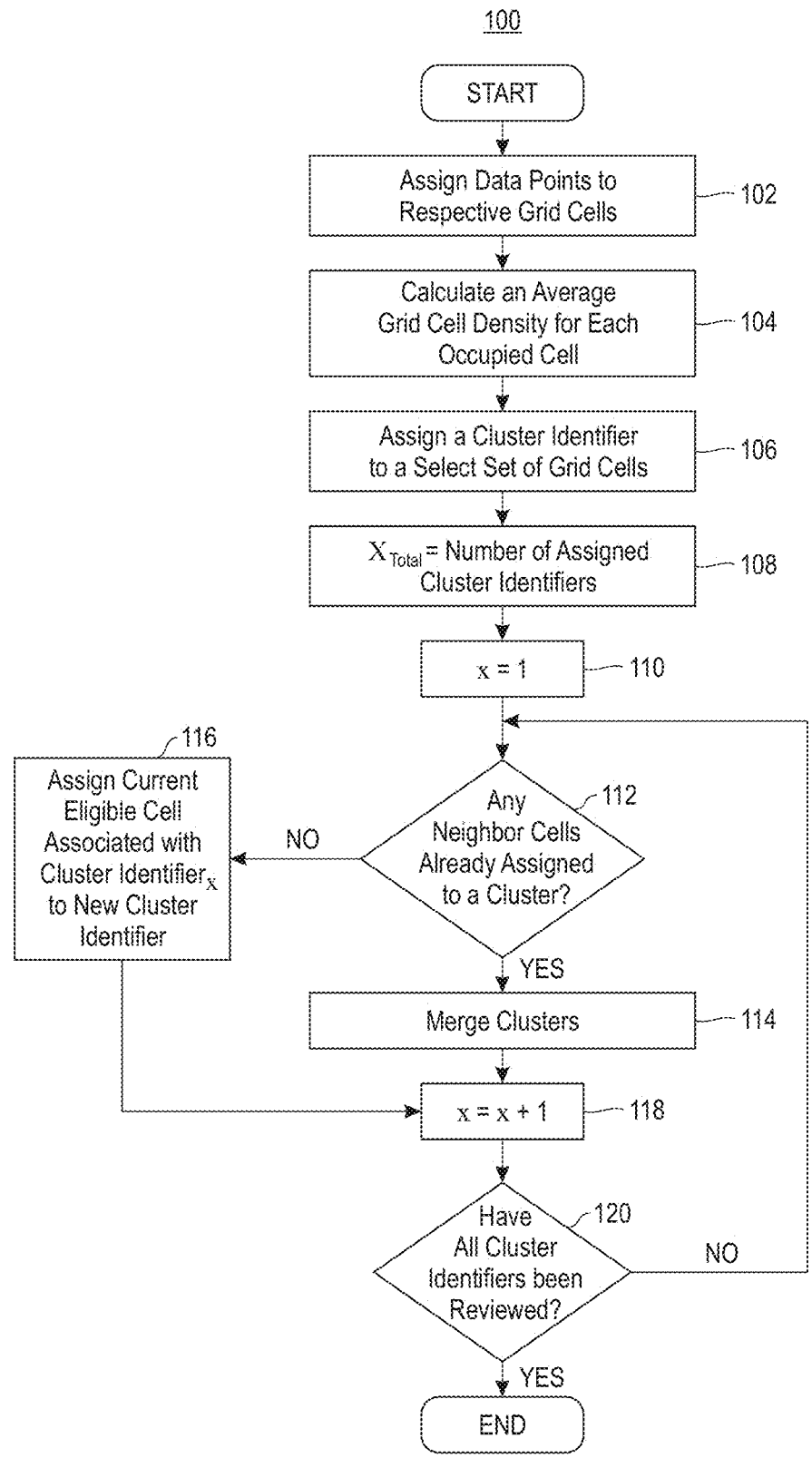
FIG. 1 depicts a flow chart illustrating a method for a cluster detection algorithm.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a detection manager, a characterization manager, a visualization manager, and an interaction manager, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

In data mining, a visual cluster is a set of points located in close proximity in a dense area of view-space, collectively perceived as an arbitrarily shaped object or structure. A view-space is usually a two- or three-dimensional projection of selected fields of a dataset, often rendered on a graphical display for users to visualize the dataset. In one embodiment, a view-space represents a fewer number of fields in the dataset than a data-space. Similarly, in one embodiment, the view-space may have three or more dimensional mappings. From a visual perspective, clusters of data include a variety of characteristics, including, but not limited to, separation, density, and shape. Potential clusters are identified and suggested for exploration. Accordingly, the first part of the data exploration is to identify one or more clusters of data.

It should be understood that a data-space contains all data in a set of data represented in n-dimensions, wherein n is an integer. The data-space is defined as the n-dimensional space that represents all fields of a dataset. A view space is an m-dimensional space where the dataset is mapped to, wherein m is an integer less than or equal to n. In one embodiment, the view space is a two dimensional plane to which data is mapped. Accordingly, a cluster, defined as a set of points located in close proximity in a dense area, may exist in a view-space and not in a data-space.

FIG. 1 is a flow chart (100) illustrating a cluster detection algorithm. Data points are assigned to respective grid cells based on their location in the view-space (102). For each occupied grid cell, an average grid cell density is calculated (104). In one embodiment, the computation of the average grid cell density supports a determination of whether to identify a cell as a potential cluster candidate. A cluster identifier is assigned to a select set of grid cells (106). In one embodiment, the assignment of a cluster identifier is limited to those grid cells with a density in excess of a threshold value. In one embodiment, the threshold value is the average grid cell density, so that each grid cell that is a member of the cluster has a density in excess of the average grid cell density. The variable $X_{Total}$ is assigned to the quantity of assigned cluster identifiers (108), and a counting variable X is assigned to the integer one (110). For each $cluster_x$ with an assigned identifier, it is determined if any neighbor cells are already assigned to a cluster (112). A positive response to the determination at step (112) is followed by a merging of two clusters (114). Specifically, the current eligible cell is assigned to $cluster_x$, as well as any other eligible cells among the neighbors being assigned to $cluster_x$. However, a negative response to the determination at step (112) is followed by formation of a new cluster (116). Specifically, the current eligible cell associated with cluster $identifier_x$ is assigned a new cluster identifier (116). Following either step (114) or (116), the counting variable X is incremented (118), followed by determining if all of the provisionally assigned cluster identifiers have been reviewed (120). A negative response to the determination at step (120) is followed by a return to step (112), and a positive response to the determination at step (120) concludes the cluster detection process. Accordingly, data points are assigned to cells, and cells are grouped to form clusters.

As demonstrated in FIG. 1, a cluster is detected based on data points and associated grid cells in the view-space. The size of a grid cell affects the density, and the threshold value employed for potential cluster membership also affects cluster detection. Furthermore, the view-space is independent of the number of dimensions in the original dataset. In one embodiment, the cluster detection algorithm of FIG. 1 may extend existing clusters with post-processing so that existing clusters are more inclusive of nearby cells in terms of propensity of density change or semantics of data points. With respect to propensity, data points or cells may be merged based upon the gradients, and with respect to semantics, cells with similar characteristics in neighboring cells may be merged to an existing cluster. Accordingly, defining characteristics of cluster formation may be expanded to address characteristics beyond and inclusive of the average cell density.

The aspect of pattern detection within a cluster requires detection of outliers. There are several types of outlier points in a visualization, including false positives, close points, and far points. A false positive is a point that lies within a visual feature, such as a cluster, but semantically does not belong with the visual feature. A close point is a point that is near a visual feature but differs in one or more dimensions that visually removes it from the cluster. A far point is a point that is distant from any visual feature of the cluster and does not possess a level of significance to be identified as a cluster member. Accordingly, to define the cluster, outliers need to be detected and either removed from the cluster or become members of the cluster.

Figure 2:
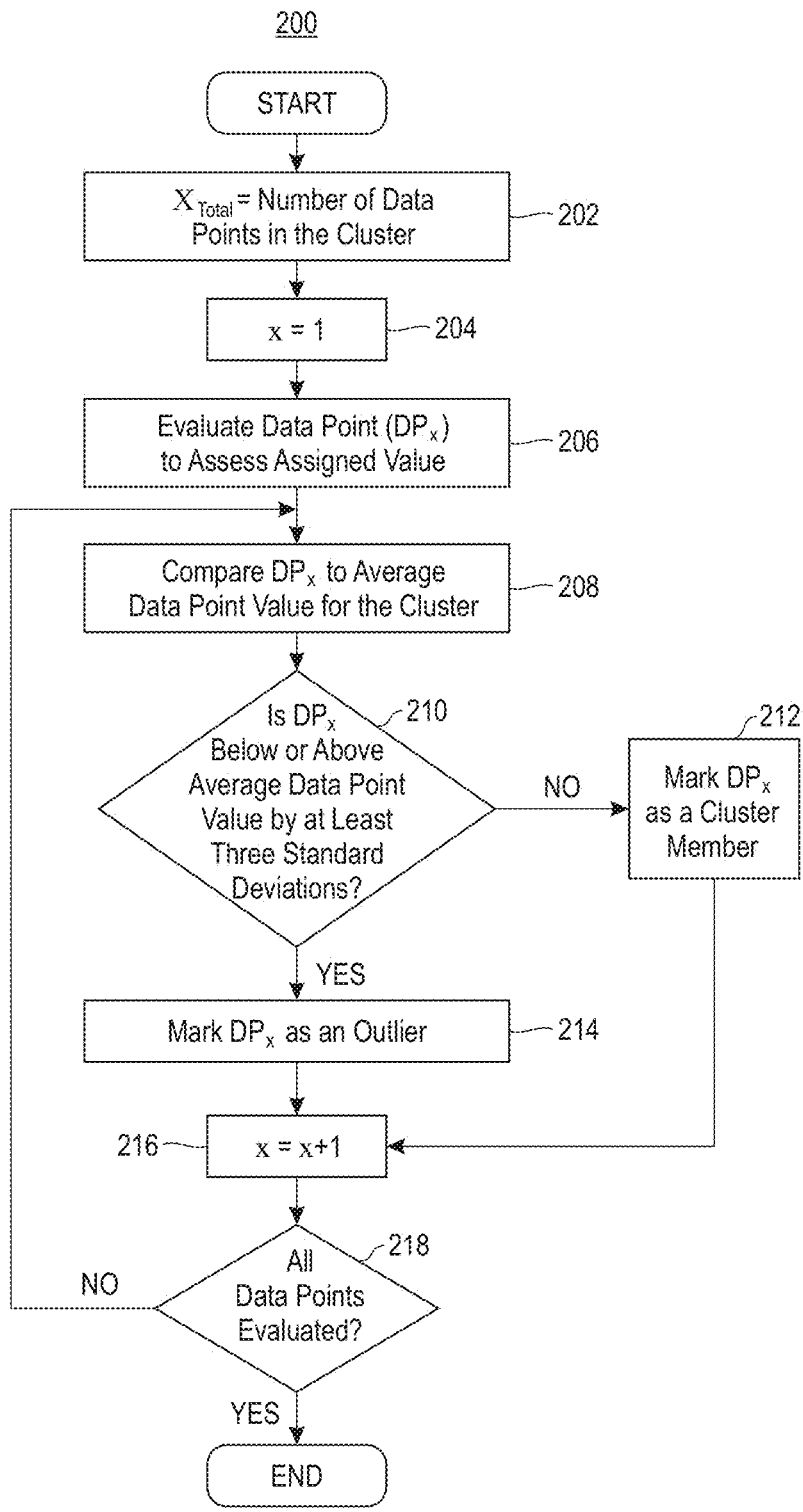
FIG. 2 depicts a flow chart illustrating a method for detecting outliers in a dataset.

FIG. 2 is a flow chart (200) illustrating a process for identifying false-positives with respect to outlier detection. The variable $X_{Total}$ is assigned to the quantity of data points in the cluster (202), and a counting variable X is assigned to the integer 1 (204). Each data point, $DP_x$, in the cluster is evaluated to assess their assigned value (206), including calculating averages for each field in the dataset. Data point, $DP_x$, is compared to the average data point value for the cluster (208). It is then determined if the value of $DP_x$ is below or above the average data point value by a set value (210). In one embodiment, the set value is at least three standard deviations (210).

A positive response to the determination at step (210) is followed by marking the data point $DP_x$ as an outlier (212) and a negative response is followed by marking the data point $DP_x$ as a cluster member (214). Following either step (212) or (214), the value of X is incremented (216), and it is then determined if all of the data points in the cluster have been evaluated for outlier status (218). A negative response to the determination at step (218) is following by a return to step (206) for the next data point evaluation. Conversely, a positive response to the determination at step (218) concludes the outlier evaluation. The process demonstrated in FIG. 2 is for each data point originally placed within the boundaries of a cluster. In one embodiment, all data points in nearby grid cells of a cluster, e.g. neighbor cells of a cluster, can go through a similar process of checking their values against means. Accordingly, as shown, each of the data points in the cluster is evaluated to determine their outlier status.

Figure 3:
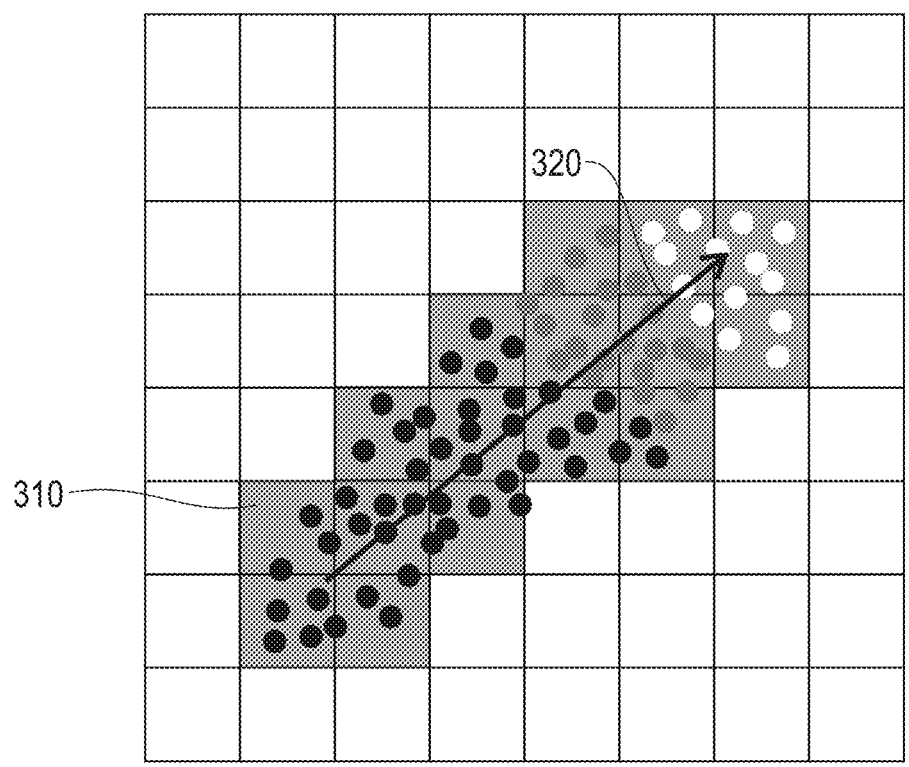
FIG. 3 depicts a diagram of a data cluster having a directional trend.
Figure 4:
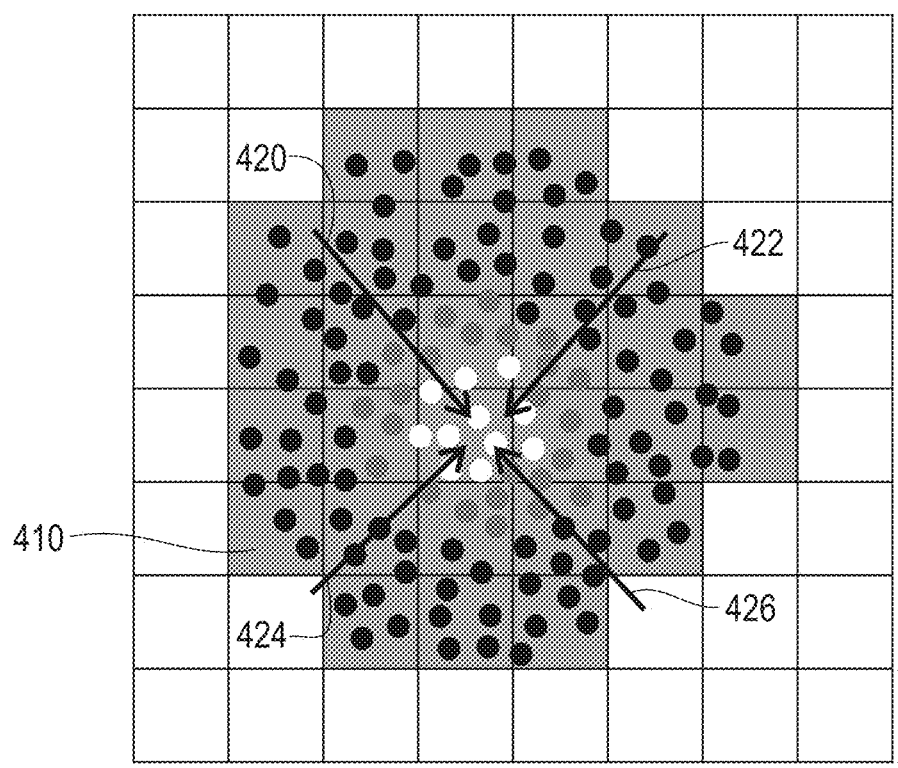
FIG. 4 depicts a diagram of a data cluster having a radial trend.

Trends are visual depictions of the form, direction, and strength of relationships in data. There are several types of trends and they reveal themselves differently in visualizations. FIG. 3 is a diagram (300) of a cluster (310) showing a directional trend (320) corresponding to dimension values increasing along the direction of the elongated cluster. As shown in FIG. 3, the shape or a cluster has an elongated shape suggesting that there is a linear relationship between two or more dimensions or a dominant dimension exhibiting a directional trend. FIG. 4 is a diagram (400) of a cluster (410) with a circular shape, suggesting that there is a radial trend. As shown in FIG. 4, there is a concentric trend (420), (422), (424), and (426) corresponding to dimension values increasing radially from the center of the cluster. There are other shapes and trends, including divergent trends where the relationship may be due to a higher order relationship in the data.

Figure 5:
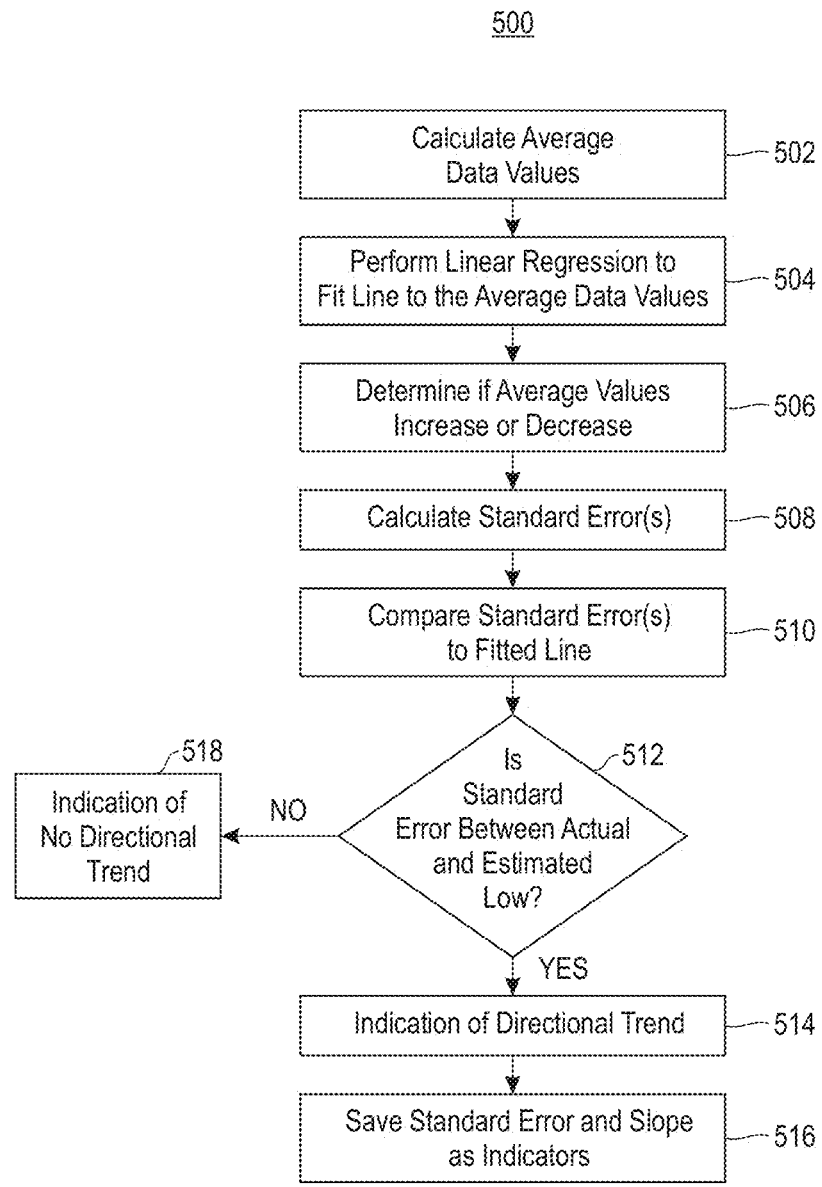
FIG. 5 depicts a flow chart illustrating a method for detecting a directional trend.

Trends are generally observed by their shapes; with the shapes revealing the characteristics of the distribution of one or more dimensions of the data elements in a cluster. A high level approach to detecting trends requires recognition of the shape of a cluster, association of the shape to a trend-type, identifying dimensions exhibiting that trend, and determining the strength of the trend. FIG. 5 is a flow chart (500) illustrating a process for detecting directional trends within a cluster. For each dimension in the cluster, the average data values are calculated for each row and column in the cluster (502). Linear regression is performed to fit a line to the average values, both vertically and horizontally (504). The aspect of line fitting determines if the average values increase or decrease consistently in a cluster across the rows or columns (506). Data associated with the fitted line represents estimated data values, and data employed for average values are calculated average values. In one embodiment, the actual average data values and estimate values are used to calculate standard errors compared to the fitted line. Specifically, using the actual average values and the estimated value, standard error(s) across the rows and columns is calculated (508), followed by a comparison of the standard error(s) to the fitted line (510). It is then determined if the standard error(s) between actual and estimated values is low, e.g. less than a set value threshold, and if the slope of the fitted line is greater than a slope threshold (512). A positive response to the determination at step (512) is an indication that there is a directional trend (514). Both the standard error and the slope of the fitted line are saved as indicators of strength and direction of the trend (516). However, a negative response to the determination at step (512) is an indication that a directional trend in the data was not found (518). Accordingly, actual data values and data values associated with a line fit are employed to ascertain a directional trend in the data cluster.

Characterization of clusters is about deriving semantics that represent the set of data points in a cluster. When deriving such semantics for a cluster, focus is placed on distinguishing characteristics in comparison to other clusters and to highlight defining characteristics of clusters. It is the defining characteristics that convey and explain high-level structure through annotations on visualizations. Several measures are employed to derive cluster semantics, including but not limited to, density of data values in a cluster, overlap with other clusters, number of outliers in a cluster, and strength of trends in a cluster.

Figure 6:
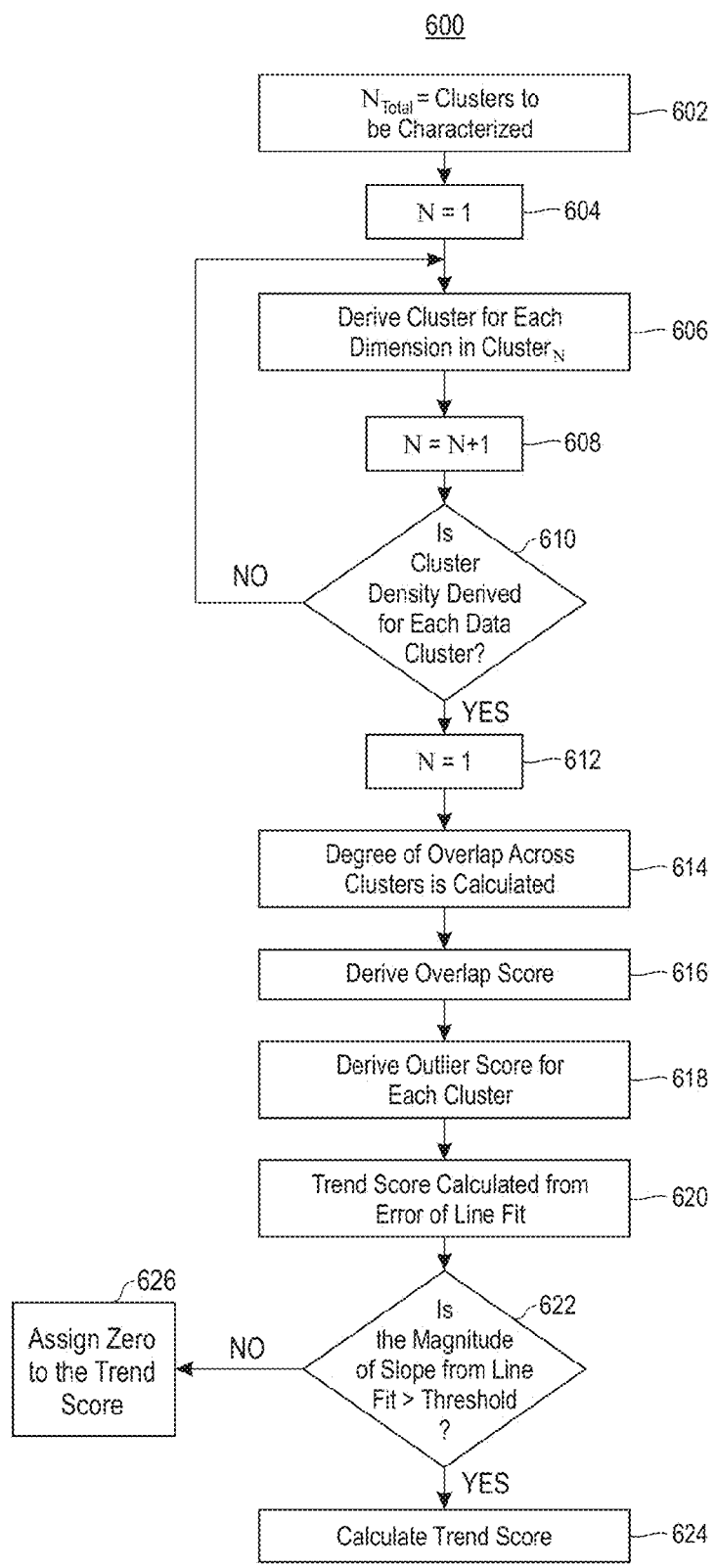
FIG. 6 is a flow chart illustrating a process for characterization of clusters to render analytics guides.

FIG. 6 is a flow chart (600) illustrating a process for characterization of clusters to render analytics guides. The first part of the characterization is to assess each of the data clusters and data values therein. The variable $N_{Total}$ is employed to represent the clusters to be characterized (602), and a counting variable N is set to the integer one (604). A cluster density is derived for each dimension in $cluster_N$ (606). In one embodiment, the derivation at step (606) includes calculating a density score between 0 and 1 based on a step function of the standard deviation with steps at 0.01 (very dense), 0.05 (moderately dense), 0.1 (somewhat dense), and 0.25 (sparse), corresponding to scores of 1, 0.8, 0.5, and 0.1, respectively. Following step (606), the counting variable N is incremented (608) and it is determined if the cluster density has been derived for each of the data clusters (610). A negative response to the determination at step (610) is followed by a return to step (606), and a positive response to the determination at step (610) concludes the cluster density derivation.

As shown in steps (602)-(610) cluster density is derived from for each dimension in each represented cluster. Following step (610) an overlap score pertaining to a degree of overlap in data value ranges across each cluster is calculated. In one embodiment, a range based on the standard deviation and means of data values are employed so that the extreme measurements of minimum and maximum values in the cluster are mitigated. The cluster counting variable N is set to the integer one (612). For each $cluster_N$ an average degree of overlap with every one $cluster_{N+1}$ to $cluster_{NTotal}$ is calculated (614). The average degree of overlap is then used to derive an overlap score for each cluster with respect to each other cluster (616). In one embodiment, an overlap score is a value between 0 and 1, with 0 being a complete overlap and 1 being no overlap. Accordingly, the higher degree of overlap between data cluster the less interesting for describing the cluster.

Following step (616), an outlier score is derived for each cluster. Specifically, for each data cluster 1 to $N_{Total}$, an outlier ratio for each cluster is derived. In one embodiment, the quotient of the number of outliers to the total number of data points in each cluster is employed to derive the outlier ratio (618). In one embodiment, a step function is employed so that the outlier score is between the values of 0 and 1, with steps at 0.05, 0.01, and 0.005 corresponding to scores 1, 0.8, and 0.6, respectively. In addition to the outlier score, a trend score is calculated. More specifically, for each data cluster 1 to $N_{Total}$, a trend score is calculated from the standard error of the line fit (620). Details of the line fit are shown in FIG. 5. It is then determined if the magnitude of the slope of the line from the line fit is above a threshold (622). A positive response to the determination at step (622) is followed by calculating a trend scope for both row and column trends (624). In one embodiment, a trend score is a value between 0 and 1 based on a step function of the standard error. Conversely, a negative response to the determination at step (622) is following by assigning zero to the trend score (626). Accordingly, for every cluster in the visualization trend scores are calculated.

Figure 7:
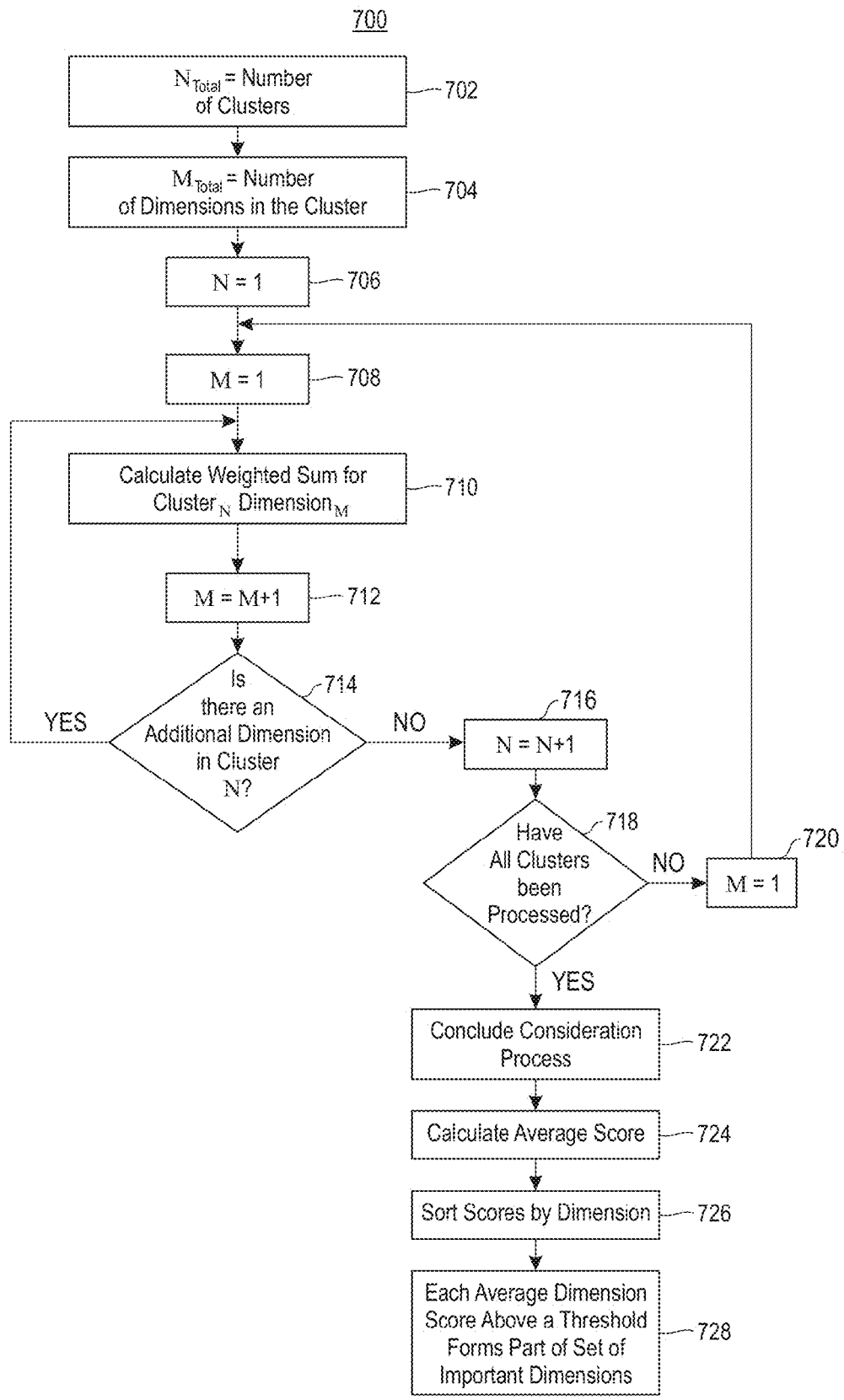
FIG. 7 is a flow chart illustrating a process for calculating a weighted sum.

As shown in FIG. 6 semantics in the forms of density, overlap, outlier, and trends are derived for every cluster in the visualization and for each dimension in the data. Following the derivations, a weighted sum of the scores for each dimension and for each cluster in the visualization is calculated. FIG. 7 is a flow chart (700) illustrating a process for calculating the weighted sum. The variable $N_{Total}$ represents the number of clusters being characterized (702), and the variable $M_{Total}$ represents the number of dimensions in the clusters being characterized (704). A counting variable for the clusters, N, is initialized (706), and a counting variable M for the dimensions, M, is initialized (708). For cluster$_N$ and dimension$_M$, a weighted sum of scores is calculated (710) as follows:

$$Score_{N,M} = (W_{density}*density + W_{overlap}*overlap + W_{outlier}*outlier + W_{rowtrend}*rowtrend + W_{coltrend}*coltrend)$$

Following the calculation at step (710), the dimension counting variable M is incremented (712) and it is determined if there are any more dimensions M in cluster$_N$ (714). A positive response to the determination at step (712) is followed by a return to step (710), and a negative response to the determination at step (712) is followed by an increment of the cluster counting variable (716). It is then determined if all of the clusters under consideration have been processed (718). A negative response to the determination at step (718) is followed by a return to step (708). However, a positive response to the determination at step (718) concludes the consideration processing of the clusters and their dimensions (722).

Following the characterizations shown in steps (702)-(722), an average score for each dimension is calculated (724). These scores are sorted by dimension (726), and each average dimension score above a threshold forms a part of a set of important dimensions (728). Accordingly, a set of characteristics in the form of density, trends, and outliers, are ascertained for each cluster and each important dimension.

Analytic guides represent characteristics of the clusters, trends, and outliers, and overlays them on top of the visualization to explain such features and provide support for interaction. There are four different types of guides corresponding to dense clusters, range clusters, outliers, and trends. In one embodiment, dense clusters are suitable for categorical data types, and range clusters are suitable for ordinal data types. A cluster can have multiple characteristics. In one embodiment, rendering of guides may be synchronized such that at any point in time all clusters show guides of the same dimension to support comparison across clusters. Similarly, in one embodiment, guides may be brushed over to highlight data points in the visualization having the same semantics. In another embodiment, guides may be graphical representations of the data, as opposed to textual descriptions. Accordingly, characteristics of the characterizations of the clusters are visualized, explained, and support interaction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The functional unit(s) described in this specification has been labeled with tools in the form of manager(s). A manager may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers and directors.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 8:
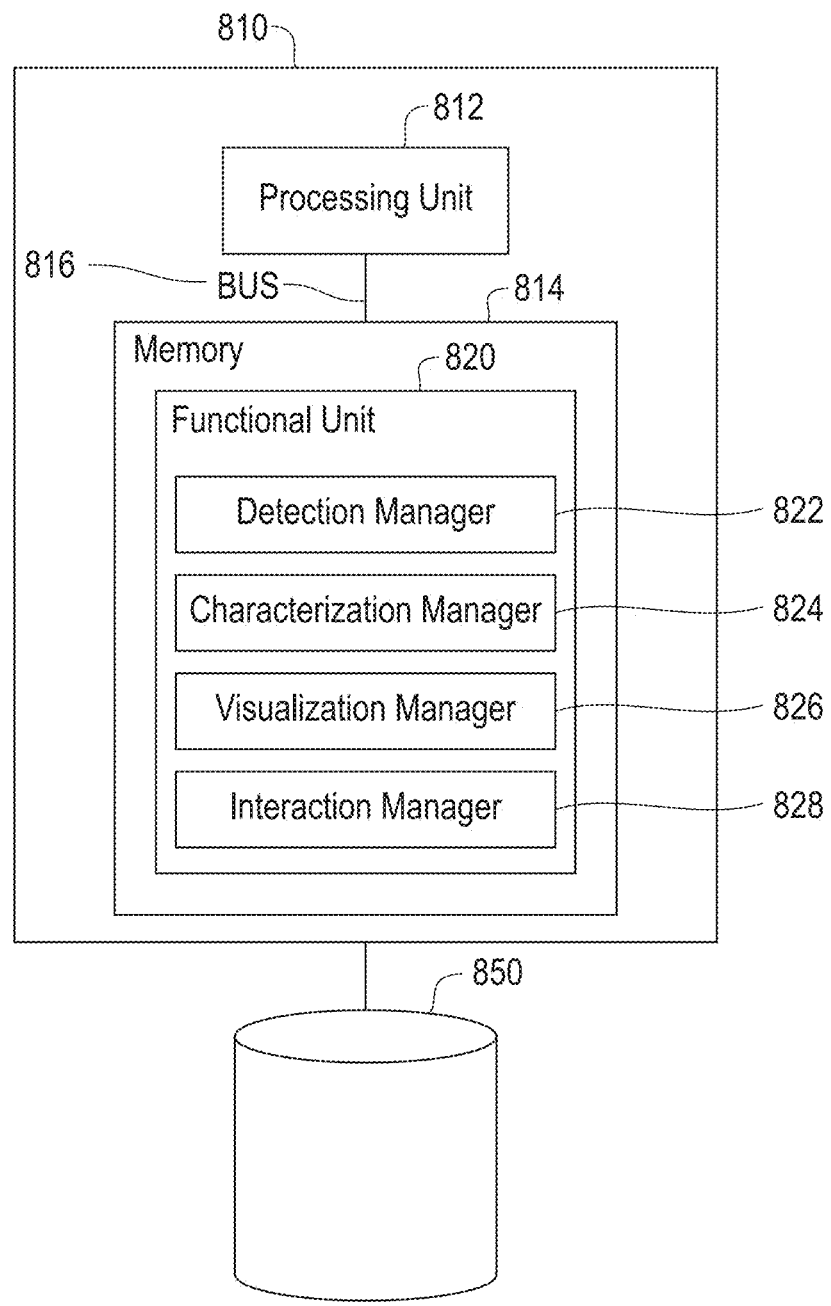
FIG. 8 depicts a block diagram illustrating tools embedded in a computer system to support data exploration, including detection and characterization of visual features.

FIG. 8 is a block diagram (800) illustrating tools embedded in a computer system to support data characterization and interaction. A computer system (810) is shown in communication with data storage (850). Although the data storage is local to the system (810), in one embodiment, the data storage may be remote from the computer system across a network connection (not shown). Similarly, while one data storage unit (850) is shown, the data storage may include any number of data storage units. The computer system (810) is provided with a processing unit (812) in communication with memory (814) across a bus (816). A functional unit (820) is provided with tools to support data characterization and interaction. More specifically, the functional unit (820) is shown embedded in memory (814), which is in communication with the processing unit (812). The tools include, but are not limited to, a detection manager (822), a characterization manager (824), a visualization manager (826), and an interaction manager (828). Each of the managers (822)-(828) support the functionality for data exploration as described herein.

The detection manager (822) functions to detect visual features among a set of data in the view-space. The detected visual features include identification of a potential data cluster in the view-space as well as any suggestions for a potential data cluster for exploration. In one embodiment, the view space is independent of a number of dimensions contained in the data set. In one embodiment, the detection manager (822) assigns data points to grid cells based on their location in the view-space, and calculates an average grid cell density for occupied grid cells. The grid cell density may be employed to determine a detected visual feature when greater than a particular threshold. In one embodiment, the detection manager (822) assigns a cluster identifier to grid cells having a high grid density, the high grid density determined to be a grid density greater than the particular threshold. In another embodiment, the detection manager (822) extends the bounds of an existing cluster in order to include a neighboring grid cell. In yet another embodiment, the detection manager (822) detects any outlier points in the identified potential cluster and compares the outlier point to the average grid cell density in each dimension in the identified potential cluster. Accordingly, the detection manager (822) detects visual features among the data responsive to a particular grid cell density.

The characterization manager (824) is provided in communication with the detection manager (826). Specifically, the characterization manager (824) functions to characterize the detected visual features using data-space. The visualization manager (826) is provided in communication with the characterization manager (824). Specifically, the visualization manger (826) functions to overlay the characterized and detected features on a visualization to support interaction. As shown, an interaction manager (828) is provided in communication with the visualization manager (826). The interaction manager (828) functions to enable interaction with the represented characteristics. In one embodiment, the supported interaction includes exploration of the detected features for comparison of select data across two or more clusters. This interaction may include but is not limited to, highlight data points in the visualization, and overlaid annotation as supported by the visualization manager (826). In one embodiment, the characterization manager (824) derives a semantic of visual features derived from data space and in one embodiment, the overlaid annotation explains the derived semantic. In one embodiment, the visualization manager (826) represents characteristics of the potential data cluster. More specifically, the visualization manager (826) represents any cluster information such as specifications regarding dense clusters and range clusters, and/or any outlier data points. The visualization manager (826) overlays these represented characteristics on a visualization to explain the characterized and detected features. Accordingly, the characterization manager characterizes detected visual features and the visualization manager overlays these characterized features on a visualization.

Data trends may also be detected among the dataset. In one embodiment, the detection manager (822) functions to detect any trends in visualization of the data supported by the visualization manager (826). In this embodiment, the characterization manager (824) recognizes a shape in the cluster as depicted by the visualization manager (826), and associates the shape with a trend-type. In this embodiment the characterization manager (824) further identifies one or more dimensions exhibiting the trend, and determines strength of a trend. In one embodiment, this trend strength is determined by how closely the detected trend associates with the shape. The detection manager (822) detects any shape type formed by the detected trend in the visualization of the data. The detected shape type defines a relationship between dimensions of data. Accordingly, trends in the data are detected and the characterization manager characterizes these trends according the strength and shape.

Figure 9:
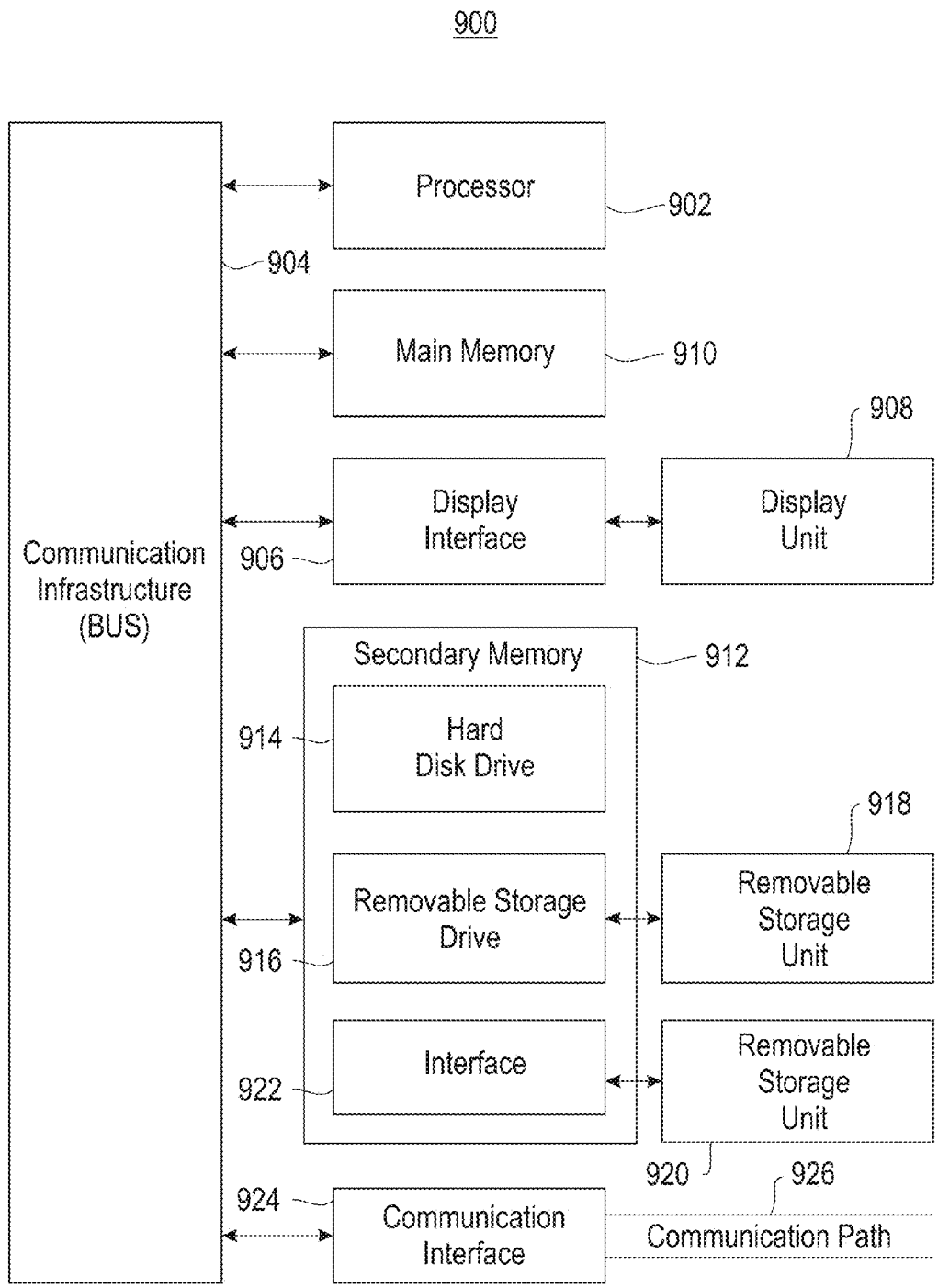
FIG. 9 depicts a block diagram showing a system for implementing an embodiment of the present invention.

Referring now to the block diagram (900) of FIG. 9, additional details are now described with respect to implementing an embodiment of the present invention. The computer system includes one or more processors, such as a processor (902). The processor (902) is connected to a communication infrastructure (904) (e.g., a communications bus, cross-over bar, or network).

The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) (or alternative persistent storage device) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by a removable storage drive (916). As will be appreciated, the removable storage unit (918) includes a computer readable medium having stored therein computer software and/or data.

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) are in the form of signals which may be, for example, electronic, electromagnetic, optical, or other signals capable of being received by communications interface (924). These signals are provided to communications interface (924) via a communications path (i.e., channel) (926). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive or alternative persistent storage device (914).

Computer programs (also called computer control logic) are stored in main memory (910) and/or secondary memory (912). Computer programs may also be received via a communication interface (924). Such computer programs, when run, enable the computer system to perform the features of the present invention as discussed herein. In particular, the computer programs, when run, enable the processor (902) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

Alternative Embodiment(s)

It will be appreciated that, although specific embodiments of the invention have been described herein for purposes of illustration, various modifications may be made without departing from the spirit and scope of the invention. Detection and characterization of visual features in the view-space may occur continuously as a user is interacting with the data, thus changing the view-space and causing re-calculation, re-detection, and re-characterization of visual features. Accordingly, the scope of protection of this invention is limited only by the following claims and their equivalents.

I claim:

1. A computer program product for exploration of a data set, the computer program product comprising a computer-readable storage medium having program code embodied therewith, the program code being executable by a processor to:
   detect a first cluster; and
   characterize the first cluster, including identifying one or more first characteristics associated with the first cluster, wherein the one or more first characteristics comprise a first trend, wherein the first trend is a visual depiction of distribution of data within the first cluster, and wherein the identification of the first trend comprises the program code to:
   recognize a first shape of the first cluster based on the first visual feature;
   associate the first shape to a trend-type;
   identify one or more dimensions exhibiting the trend-type; and
   determine a strength of the trend-type from the identified one or more dimensions, including program code to calculate average values associated with each identified dimension and perform a standard error based on the calculated average values; and
   overlay the identified one or more first characteristics on a visualization for supporting interaction, the supported interaction including exploration of the identified one or more first characteristics for comparison of select data across two or more clusters.

2. The computer program product of claim 1, further comprising program code to assign data points to one or more grid cells based on respective locations in a view-space, wherein the detection of the first cluster comprises identifying a cluster candidate from at least one of the one or more grid cells, and wherein identifying the cluster candidate includes program code to:
   calculate an average grid cell density of the one or more grid cells, and a density of the cluster candidate; and
   assign a cluster identifier to the cluster candidate in response to the density of the cluster candidate exceeding the average grid cell density.

3. The computer program product of claim 2, wherein the view-space is independent of a number of dimensions in the first cluster.

4. The computer program product of claim 2, further comprising program code to extend an existing cluster to include a neighboring grid cell.

5. The computer program product of claim 1, further comprising program code to detect an outlier point in the first cluster, including program code to compare a value of a point in the first cluster to an average point value of the first cluster, wherein the point is detected as the outlier point in response to the value of the point being outside of a range of the average point value.

6. The computer program product of claim 1, wherein the first shape is elongated and associated with a directional trend-type.

7. The computer program product of claim 1, wherein the first shape is circular and associated with a radial trend-type.

8. The computer program product of claim 1, wherein the one or more first characteristics further comprise a selection from the group consisting of: a dense cluster, a range cluster, an outlier, and any combination thereof.

9. The computer program product of claim 8, further comprising program code to interact with the represented characteristics, including program code to highlight data points in the visualization and overlay an annotation to explain semantics of visual features derived from data space.

10. A system comprising:
    a processing unit in communication with data storage, the data storage comprising at least one data set;
    a functional unit in communication with the processing unit, the functional unit including tools to support data exploration, the tools comprising:
    a detection manager to detect a first cluster; and
    a characterization manager in communication with the detection manager, the characterization manager to characterize the first cluster, including identifying one or more first characteristics associated with the first cluster, wherein the one or more first characteristics comprise a first trend, wherein the first trend is a visual depiction of distribution of data within the first cluster, and wherein the identification of the first trend comprises the characterization manager to:
    recognize a first shape of the first cluster based on the first visual feature; associated the first shape to a trend-type;
    identify one or more dimensions exhibiting the trend-type; and
    determine a strength of the trend-type from the identified one or more dimensions, including the characterization manager to calculate average values associated with each identified dimension and perform a standard error based on the calculated average values;
    a visualization manager in communication with the characterization manager, the visualization manager to overlay the identified one or more first characteristics on a visualization; and
    an interaction manager in communication with the visualization manager, the interaction manager to support interaction based on the overlay, the supported interaction including exploration of the identified one or more first characteristics for comparison of select data across two or more clusters.

11. The system of claim 10, further comprising the detection manager to assign data points to grid cells based on respective locations in a view-space, wherein the detection of the at least one cluster comprises identifying a cluster candidate from at least one of the one or more grid cells, including the detection manager to calculate an average grid cell density of the one or more grid cells and a density of the cluster candidate, and assign a cluster identifier to the cluster candidate in response to the density of the cluster candidate exceeding the average grid cell density.

12. The system of claim 11, further comprising the detection manager to extend an existing cluster to include a neighboring grid cell.

13. The system of claim 11, further comprising the detection manager to detect an outlier point in the first cluster, including the detection manager to compare a value of a point in the first cluster to an average point value of the first cluster, wherein the point is detected as the outlier point in response to the value of the point being outside of a range of the average point value.

14. The system of claim 10, wherein the first shape is elongated and associated with a directional trend-type.

15. The system of claim 10, wherein the first shape is circular and associated with a radial trend-type.

16. The system of claim 10, wherein the one or more first characteristics further comprise a selection from the group consisting of: a dense cluster, a range cluster, an outlier, and any combination thereof.

17. The system of claim 16, further comprising the interaction manager to enable interaction with the represented characteristics, including the interaction manager to highlight data points in the visualization, and the visualization manager to overlay an annotation to explain semantics of visual features derived from data space.

18. The computer program product of claim 1, further comprising program code to:
- detect and characterize a second cluster, including program code to identify one or more second characteristics associated with the second cluster, wherein the one or more second characteristics comprise a second trend; and
- overlay the identified characteristics of the second cluster on a visualization for supporting interaction, the interaction including a comparison of select data across at least the first and second clusters.

19. The system of claim 10, further comprising:
the detection manager to detect a second cluster;
the characterization manager to characterize the second cluster, including the characterization manager to identify one or more second characteristics associated with the second cluster, wherein the one or more second characteristics comprise a second trend;
the visualization manager to overlay the identified characteristics of the second cluster on a visualization; and
the interaction manager to support interaction, the interaction including a comparison of select data across the first and second clusters.

20. The computer program product of claim 1, further comprising program code to re-identify the first trend in response to interaction with data associated with the first cluster.

\* \* \* \* \*